(12) United States Patent
Gill et al.

(10) Patent No.: US 6,949,392 B2
(45) Date of Patent: Sep. 27, 2005

(54) INTEGRATED OPTICAL CIRCUIT WITH DENSE PLANARIZED CLADDING LAYER

(75) Inventors: David M. Gill, Pasadena, MD (US); Frederick G Johnson, Lanham, MD (US); Oliver S. King, Annapolis, MD (US)

(73) Assignee: Little Optics, Inc., Annapolis Junction, MD (US)

( * ) Notice: Subject to any disclaimer, the term of this patent is extended or adjusted under 35 U.S.C. 154(b) by 0 days.

(21) Appl. No.: 10/837,685

(22) Filed: May 4, 2004

(65) Prior Publication Data

US 2004/0201026 A1 Oct. 14, 2004

Related U.S. Application Data

(62) Division of application No. 10/441,052, filed on May 20, 2003, now Pat. No. 6,768,828
(60) Provisional application No. 60/423,162, filed on Nov. 4, 2002.

(51) Int. Cl.[7] .................... H01L 21/469; C23C 16/40
(52) U.S. Cl. .................... 438/31; 438/695; 438/697; 427/255.37; 65/386
(58) Field of Search ................. 438/29, 31, 695, 438/697, 710; 427/99.3, 255.28, 255.29, 255.37, 255.395; 65/386

(56) References Cited

U.S. PATENT DOCUMENTS

| 5,800,621 | A |   | 9/1998  | Redeker et al. ...... 118/723 AN |
|-----------|---|---|---------|----------------------------------|
| 5,814,564 | A |   | 9/1998  | Yao et al. .................. 438/723 |
| 5,885,881 | A | * | 3/1999  | Ojha ........................... 438/381 |
| 5,904,491 | A |   | 5/1999  | Ojha et al. ................... 438/31 |
| 5,976,993 | A |   | 11/1999 | Ravi et al. ................... 438/788 |
| 6,044,192 | A |   | 3/2000  | Grant et al. ................. 385/129 |
| 6,122,934 | A | * | 9/2000  | Narita et al. .................. 65/379 |
| 6,261,957 | B1|   | 7/2001  | Jang et al. ................... 438/692 |
| 6,335,288 | B1|   | 1/2002  | Kwan et al. .................. 438/694 |
| 6,411,765 | B1| * | 6/2002  | Ono ............................ 385/131 |
| 6,705,124 | B2| * | 3/2004  | Zhong et al. .................. 65/386 |
| 2002/0181829 | A1 |   | 12/2002 | Margalit et al. ............. 385/14 |
| 2002/0191931 | A1 | * | 12/2002 | Ferm et al. ................. 385/129 |
| 2003/0110808 | A1 | * | 6/2003  | M'Saad et al. ............... 65/379 |
| 2003/0113085 | A1 | * | 6/2003  | M'Saad ...................... 385/129 |
| 2003/0235383 | A1 | * | 12/2003 | Gardner et al. ............. 385/129 |

OTHER PUBLICATIONS

Nguyen, "High Density Plasma Chemical Vapor Deposition of Silicon–Based Dielectric Films for Integrated Circuits," IBM J. Res. Dev., vol. 43, No. 1 / 2 Jan./Mar. 1999, pp 109–126.

\* cited by examiner

Primary Examiner—Stephen W. Smoot

(57) ABSTRACT

The integrated optical circuit of the present invention includes a substrate with a first cladding layer. A first core layer having one or more waveguiding elements is formed on the first cladding layer. A second cladding layer surrounds the waveguiding elements of the first core layer; the refractive index of the first and second cladding layers are selected to be less than the refractive index of the waveguiding element(s). Through simultaneous cladding material deposition and cladding material removal, the second cladding layer as deposited is substantially self-planarized, enabling further layers to be positioned on the second cladding layer without necessitating intermediate planarization. Further, the present invention permits planar waveguide cores having submicron core spacings to be covered by a subsequently-deposited cladding layer without cladding gaps, seams or other deleterious cladding defects.

10 Claims, 6 Drawing Sheets

INTEGRATED OPTICAL CIRCUIT WITH DENSE PLANARIZED CLADDING LAYER

CROSS-REFERENCE TO RELATED APPLICATIONS

This application is a divisional of U.S. patent application Ser. No. 10/441,052, filed May 20, 2003 now U.S. Pat. No. 6,768,828, which claims priority from U.S. Provisional Application Ser. No. 60/423,162 filed Nov. 4, 2002, the disclosure of which is incorporated by reference herein.

BACKGROUND OF THE INVENTION

1. Field of the Invention

The invention relates to integrated optical circuits generally and, more particularly, to integrated optical circuits having dense and substantially planar cladding layers formed over optical core waveguiding elements and methods of making such optical circuits. The combination of optical core and cladding layer creates an optical waveguide that may be combined with other optical waveguides and/or devices (such as ring resonators, arrayed waveguide grating multiplexers/demultiplexers, optical add/drop multiplexers, optical switches, variable attenuators, polarization splitters/combiners, multimode interference (MMI) couplers, Mach-Zehnder interferometers, tunable filters, and dispersion compensators) on a substrate to form an integrated optical device or planar lightwave circuit useful for optical communications.

2. Description of the Related Art

Planar optical waveguides are the key building block for integrated optical circuits. A typical planar optical waveguide is formed on a substrate covered with a buffer/cladding layer, a core layer in which waveguiding elements are defined, and a cladding layer surrounding the waveguiding elements. Conventional methods of forming optical waveguides on a substrate to make an optical device, integrated optical device, or planar lightwave circuit typically rely on one of two general methods to deposit the optical cladding layer over an optical core: flame hydrolysis or vapor deposition. One known conventional cladding deposition method uses a single step vapor process such as plasma-enhanced chemical vapor deposition (PECVD). Prior art single-step vapor deposition methods tend to produce poor results for the op cladding layer due to the interaction of local topography (e.g., the core waveguiding elements positioned on the substrate) and the fundamentally conformal nature of CVD growth shadowing and coating overhangs resulting from the large variations in local topography.

FIG. 1 schematically depicts a representative planar waveguide for an optical integrated circuit formed via conventional, single-step vapor deposition. Waveguide 10 includes a substrate 20, buffer layer 30, waveguiding core elements 40, and cladding layer 50. Various defects exist in the cladding layer as a result of the prior art process. Element 52 depicts the substantially non-planar topography formed in which the final upper cladding surface exhibits local non-planar features with a height deviation approximating that of the original waveguide core height. Large topographic features on the cladding layer require application of a planarization process to achieve a sufficiently flat final surface. Non-planar surface topography can interfere and distort the optical mode shape in optical waveguide elements 40 as well as make it impossible to form or stack additional optical device features (e.g., additional waveguides, resistive heater elements, sensors) on the surface of cladding 52 without intermediate planarization processes.

For closely-spaced waveguide elements 40, void 54 can form during deposition due to the poor gap filling capability of prior art CVD) techniques. In general, gap fill becomes increasingly difficult as the ratio of feature height to feature spacing becomes greater than one. The presence of a void in the optical cladding layer creates a non-uniformity in the optical cladding refractive index that may distort the optical mode shape or cause optical scattering.

A phenomenon having a similar effect as a void is shown as feature 56. Here, two seams (or linear voids) form where the sidewall growth front and the floor growth front meet during the cladding layer deposition step. In addition to physical defects 52, 54, and 56, single step vapor deposition techniques typically create significant stress 58 (and stress-related optical birefringence), in the cladding layer, particularly when a high temperature annealing process is used. Generally, the stress and birefringence vary with position as a function of distance from a starting feature such as the lower clad/buffer layer or optical waveguide core elements. The result is pattern dependent optical birefringence that can greatly affect the polarization performance of optical waveguides and devices such that two orthogonal polarizations behave differently on passing through the device.

Voids and seams in the optical cladding of a waveguide or device create unacceptable non-uniformities in the cladding refractive index that cause optical loss via scattering, optical birefringence in the refractive index, or distortion of the optical mode shape from the optimal design geometry. Even small localize variations in the cladding refractive index ($\Delta n \sim 10^{-4}$ to $10^{-3}$) greatly affect the proper operation of a sensitive optical device such as a mode transformer, ring resonator, or interferometer that relies on precise refractive index values and refractive index contrast between clad and core for proper operation.

To avoid some of the cladding problems caused by conventional single-step vapor deposition, U.S. Pat. No. 6,044,292 uses several cycles of alternating vapor deposition and annealing steps. The first step is a low pressure CVD (LPCVD) deposition of a thin borophosphosificate glass (BPSG) layer followed by a second step comprising high temperature annealing (T>700C) to reflow the BPSG glass. In this manner, a 20 µm optical cladding layer can be slowly built after several alternating sequences of deposition and annealing. Although this technique tends to eliminate formation of voids 42, there are several drawbacks. First, the extended process time associated with a multi-step process as well as high temperature annealing increases cost and decreases yield. Second, the resulting cladding layer typically has nonplanar topography as seen in the figure of the '044 patent. Further, the cladding layer may experience annealing-related stress due to mismatch among the coefficients of thermal expansion (CTE) of the various layer and substrate materials. This stress creates optical birefringence in the cladding layer refractive index. Often, this birefringence varies depending on the distance from a feature or features on the wafer (pattern dependent birefringence) as the dynamics of the glass reflow process can be influenced by the presence of rigid non-flowing structures nearby (e.g., the waveguiding core elements). The use of BPSG limits the refractive index choice for the cladding layer to a narrow region near 1.46. Additionally, high temperature annealing severely limits substrate choices both in terms of the material selected (which must be able to withstand such temperatures) and in terms of any devices previously formed on the selected substrate that may be destroyed during annealing.

Two other potential methods for depositing an optical cladding layer to form a waveguide are physical vapor deposition such as sputter deposition (DC sputter deposition, reactive sputter deposition, RF sputter deposition, or magnetron sputter deposition), and polymer coating of optical materials. These two methods are currently less common in optical waveguide applications than the previously mentioned vapor deposition methods. Sputter coatings tend to suffer from similar problems as vapor deposition in that the finished cladding layer is non-planar, the gap fill capability is poor, and voids may be present in the cladding. These coatings are difficult to deposit with precise index control and good uniformity. Polymer cladding layers avoid most of these problems and often produce planar and void-free optical cladding layers. However, polymer materials are not as robust, their refractive index is not as temporally, thermally and environmentally stable as silica-containing glasses, and they tend to have moderate to high values of optical birefringence.

Therefore, there is a need in the art for improved cladding layers for planar waveguides forming optical integrated circuits. The cladding layers must be dense (no voids), exhibit a substantially uniform refractive index throughout the cladding, and have sufficiently planar cladding surfaces.

SUMMARY OF THE INVENTION

The present invention overcomes the disadvantages of prior integrated optical circuits by providing an integrated optical circuit having a dense, void-free, and uniform stress cladding layer that is sufficiently planar such that further layers may optionally be provided on the cladding layer without an intermediate planarization step.

The integrated optical circuit includes a substrate with a first cladding layer having a first refractive index positioned on the substrate. A first core layer having a core refractive index is formed on the first cladding layer, the core layer includes one or more defined waveguiding elements. In particular, the present invention permits waveguides to be patterned having a ratio of waveguide height to waveguide spacing of greater than 1 without defects such as voids being formed between the waveguides during subsequent cladding deposition. A second cladding layer having a second cladding refractive index surrounds the waveguiding elements of the first core layer. The second cladding refractive index and the first cladding refractive index are selected to be less than the core refractive index. The second cladding layer is created through a process of simultaneous cladding material deposition and removal, the ratio of cladding material deposition to cladding material removal being approximately greater than 1 and less than 20. In this manner, the second cladding layer is substantially void-free and substantially self-planarizing, enabling further layers to be directly positioned on the second cladding layer without necessitating intermediate planarization (e.g., reflow of the cladding layer, etching, and or polishing).

DETAILED DESCRIPTION

Turning now to the drawings in detail, FIGS. 2A–2E depict the formation of an optical cladding over one or more optical core features to form an optical waveguide. Typically, the optical waveguide is used in the formation of an integrated optical circuit/optical device. The expression "integrated optical circuit/optical device" as used herein, describes a combination of transparent elongated structures or components formed on a common substrate or chip of monolithic or hybrid construction; the substrate can include electrical devices or other optical elements. The transit elongated optical structures can create a single optical device (e.g., an individual microresonator) or an optical system (a series of microresonators formed into a demultiplexer). The techniques of the present invention are not limited to the formation of particular optical circuits/devices but are broadly applicable to any optical configuration that includes an optical waveguide formed on a substrate.

Figure 1:
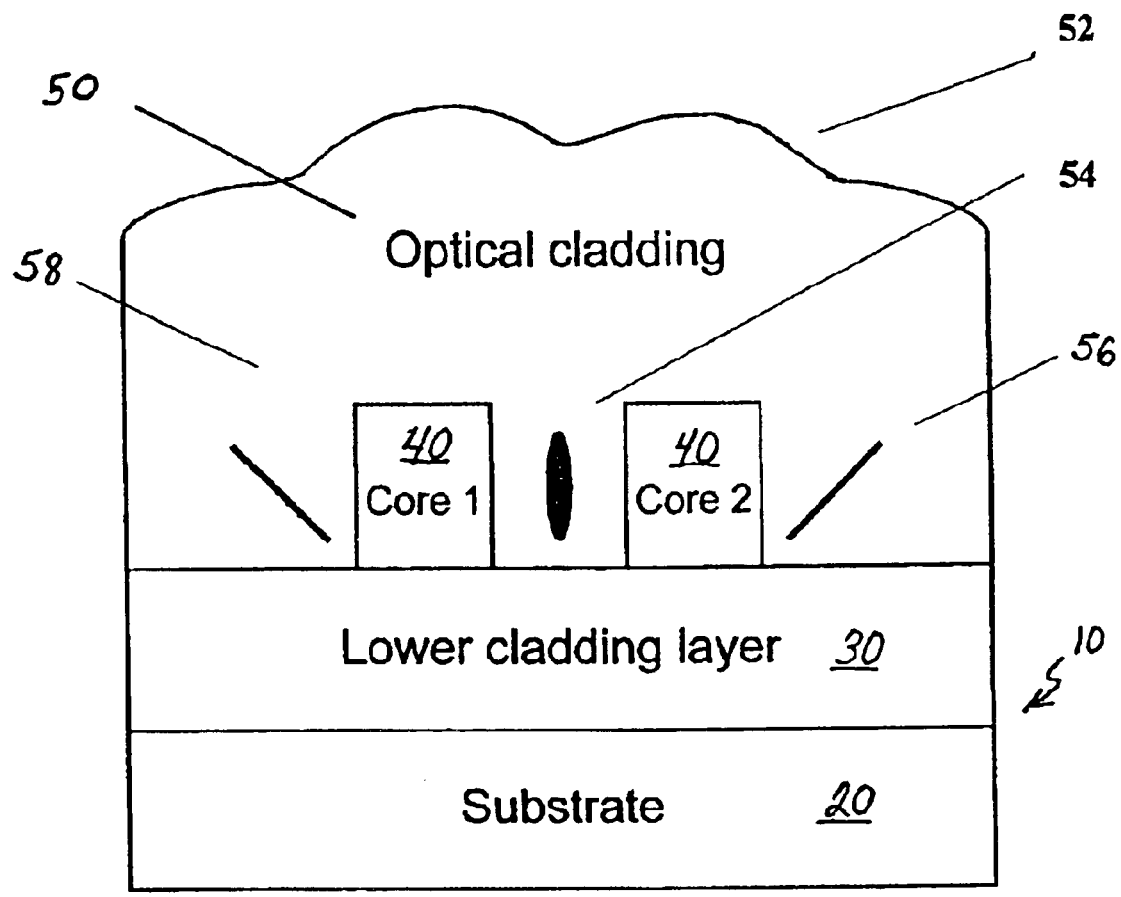
FIG. 1. depicts a prior art cladding layer having various cladding defects positioned over waveguide cores in a planar waveguide device.
Figure 2A:
FIGS. 2A–2E show a process for forming an optical waveguide structure and the resultant structure for an optical circuit/device according to one embodiment of the present invention.

As seen in FIG. 2A, a substrate 100 is selected. Substrate 100 is selected from any suitable material such as silicon, silica, fused quartz, sapphire, glass, gallium-arsenide, silicon carbide, indium phosphide, or other carriers. The material is selected according to the particular application intended for the waveguiding structure or structures. Because the present invention does not require high temperature annealing, (the expression "high temperature annealing" refers to annealing temperatures of greater than approximately 500° C.), it is particularly suited for the formation and integration of optical waveguides on substrates that include preformed electronic, optical and/or optoelectronic devices that would normally be destroyed by high temperature processing.

Figure 2B:
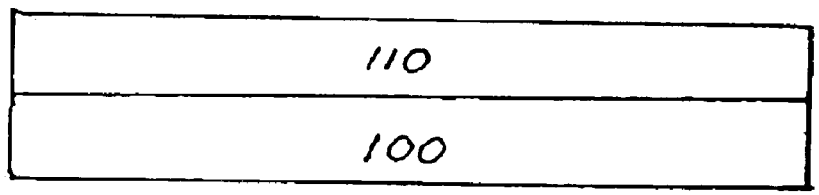

In FIG. 2B, a lower optical cladding layer 110 is formed such that the refractive index of the optical cladding is lower than that of the optical core. In some cases, the substrate 100 itself can serve as the lower optical cladding layer; in such applications, layer 110 is omitted. A common choice for substrate 100 and lower cladding layer 110 is silicon and thermal oxide of silicon ($SiO_2$) respectively. Alternatively, the selection of lower cladding layer 110 is from the same group of materials used for the upper cladding layer, discussed below. The fabrication method used to form lower cladding layer 110 is not critical; thus the lower cladding layer may be formed using vapor deposition, sputtering, flame hydrolysis or any other deposition technique that forms a layer with a refractive index lower than the optical core. Typical lower cladding thicknesses vary from about 1 to about 30 microns; selection of a particular thickness depends on the application of the finished device.

Figure 2C:
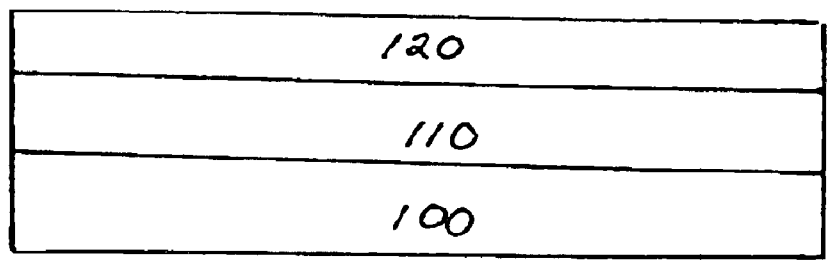

In FIG. 2C, an optical core layer 120 is formed on lower cladding 110. As with the cladding layer, the method of forming the optical core is not critical and the core is produced by any known deposition method such as vapor deposition, sputter deposition, flame hydrolysis, or any other thick or thin film layer formation process. Typical optical core materials include: silica ($SiO_2$); silica combined with germanium ($Si_xGe_yO$), nitrogen ($SiO_xN_y$), carbon ($SiO_xC_y$), or fluorine ($SiO_xF_y$); silica doped with boron (borosilicate glass, BSG) or phosphorus (phosphosilicate glass, PSG); or silica combined with a combination of two or more of the following (germanium, nitrogen, carbon, fluorine, boron, and phosphorus). Typical optical core layer thicknesses vary from 0.5 to 20 microns, and typical refractive index values range from 1.4 to 2.0.

Figure 2D:
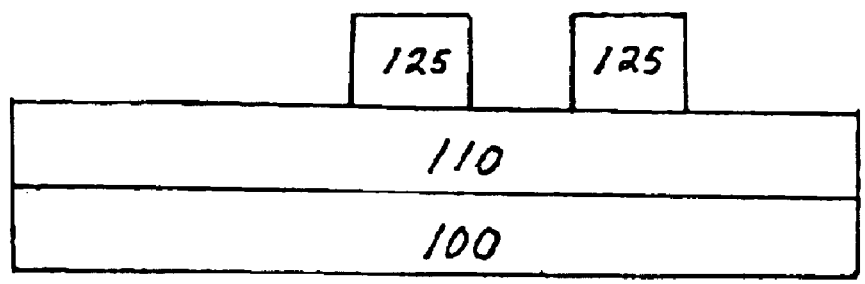

An optical waveguiding core feature/element is then patterned into the optical core layer. This can be done using a lithographic technique such as photolithography, electron beam lithography, or x-ray lithography to transfer a pattern from a mask or directly write a pattern into a material such as photoresist residing on top of the optical core layer. The photoresist can then be developed and used as an etch masking material or used in a manner to next deposit a different masking material (such as metal or dielectric) over or around the optical core element. The optical waveguide core element results from selectively removing the lithographic patterned area not covered by a masking material from the optical core layer using any known chemical and/or physical etching processes such as wet chemical etching, ion beam etching, sputtering, plasma etching (reactive ion etching (RIE), inductively coupled plasma etching (ICP), high density plasma etching (HDP), and/or electron cyclotron resonance etching (ECR)), or any other technique for removing the selected portions of core layer 120. Optical core waveguiding elements 125 remain after this process, as depicted in FIG. 2D. In an exemplary embodiment, elements 125 have heights of 0.5 to 15 microns and widths of 0.5 to 15 microns Although two optical core elements are depicted in FIG. 2D it is understood that the present invention also applies to one or more core element(s) 125 formed on a cladding. Further, the cross-sectional geometry of element(s) 125 is illustrative; a particular waveguiding element geometry will be dictated by the function of the completed optical circuit/device.

Alternatively, optical core waveguiding elements 125 are directly deposited onto cladding 110 in a "direct write" deposition process (such as a laser or other energy beam-induced CVD onto the cladding) or through a mask via, for example, a vapor or sputter type of deposition process. In such processes there is no removal of a portion of layer 120 surrounding element(s) 125; only element(s) 125 are formed on the first cladding layer. Again, the method for creating optical waveguiding element(s) 125 is not critical so any process may be selected; process selection is usually optimized for the particular material to be used as the core.

Figure 2E:
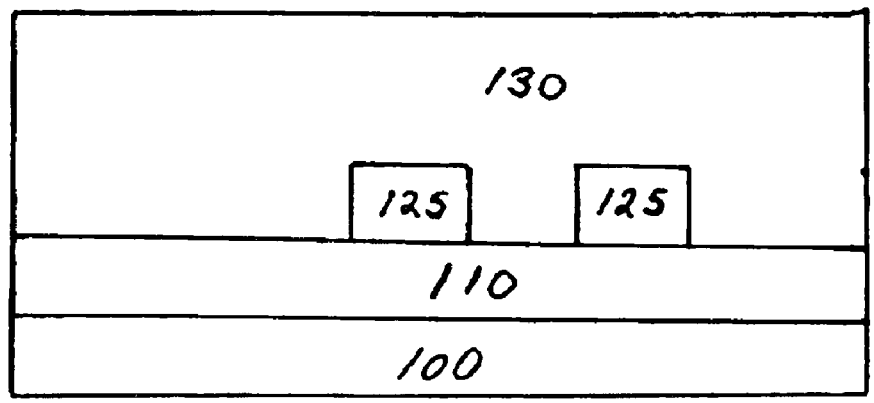

As shown in FIG. 2E, a second cladding layer 130 is formed The second cladding layer is formed over optical core waveguiding elements 125 through simultaneous cladding material deposition and cladding material removal For purposes of the present invention, simultaneous material deposition (D) and removal (R) are expressed as a ratio of rates D/R To create cladding layer 130, the value of D/R is greater than 1 with typical values ranging from 2 to 20. In an exemplary embodiment, the D/R ratio is selected to be between approximately 3 and 5; more particularly, a D/R of 3.3 to 4.7 is selected. During deposition, the simultaneous material removal occurs more rapidly from upper sloped regions of the growing film, such as regions near the upper corners of optical core waveguiding element 125; material is removed more slowly from the sidewalls, flat, and lower regions. The result is substantially improved gap fill, as the gap between two raised features pinches off more slowly due to selective removal of material from the top corners of the gap. Substantial concurrent material deposition and material removal also advantageously forms a layer that becomes increasingly planar as deposition continues. This enhanced planarization occurs when material deposited on irregular features or topography, such as waveguiding core elements 125, is removed more quickly than material deposited on the surface of cladding 110.

An exemplary process of simultaneous material deposition and material removal uses at least one high-density plasma chemical vapor deposition step to accumulate a cladding layer thickness typically ranging from 0.3 to 30 microns. HDPCVD differs from conventional vapor deposition techniques in that there is a high rate of material removal during the formation of cladding 130. In HDPCVD, a high-density plasma is generated via a source that is capable of producing a plasma ion density on the order of $1 \times 10^{12}$ ion/cm$^3$. Typical sources include microwave sources, electron cyclotron resonance (ECR) sources, and inductively coupled plasma (ICP) sources with an independent RF bias applied to the substrate. HDPCVD reactors, such as the Ultima Centura product line, are commercially available from Applied Materials, Santa Clara, Calif.

During HDPCVD, a large ion flux incident on the substrate bombards the growing film. The dense plasma and low vacuum create an incident flux containing many highly reactive species, depending on the gases being used, that react chemically to the form a film Ion bombardment additionally supplies substantial energy to the growth surface, helping to density the film. At the same time, angle-dependent material removal occurs when deposited material is preferentially depleted through incident ion collision with sloped s on the growing film. For planar waveguide topographies, straight sidewalls and planar features have low material removal rates while angled features have larger material removal rates. Despite the substantial amount of material removal during deposition, commercially practical growth rates (~0.5 $\mu$m/min) are obtained at relatively low chamber pressures (generally 1–10 mTorr), and high quality films are grown at significantly lower temperatures than conventional vapor deposition processes. In particular, the resultant layers exhibit substantially uniform compressive stress having values on the order of one to several hundred MPa. Additionally, the cladding/core combination of the present invention exhibits a low optical loss (less than approximately 5 dB/cm and typically less than about 1 dB/cm and, more particularly, less than about 0.2 dB/cm) in the wavelength band of 1 micron to 2 microns (the region typically employed in commercial optical communications).

Further, HDPCVD processes can be optimized for numerous applications including deposition over features with large aspect ratios and narrow gaps by modifying the material deposition rate (D), material removal rate (R), deposition/removal ratio D/R, deposition the pressure, RF power, gas species, and gas flow rates. Generally, the larger the aspect ratio and the narrower the gap between optical waveguiding core features, the lower the D/R ratio that is selected. Although the net material accumulation is lower, the substantial material removal helps to ensure a better gap fill and more planar film. In particular, gaps between adjacent features, such as two optical waveguide cores 125 can be uniformly filled with cladding material even for high ratios (>5:1) of feature height to feature spacing and/or narrow gaps (<0.5 $\mu$m) with an optimizing process. In contrast, conventional vapor deposition processes generally have difficulty filling gaps with ratios of feature height to spacing of 1:1 for submicron spacings. Similarly, high aspect ratio waveguide cores (height/width >15:1) can be blanket covered with a seam-free optical cladding layer using an HDPCVD cladding process.

Exemplary deposition process parameters comprise an RF power of 1 to 5 kW, chamber p between 1 to 25 mTorr, growth rate of 0.05 to 0.5 microns per minute, deposition temperature of 150° to 500° C., gas flows ranging from 1 to 200 sccm, and a D/S ratio of deposition to sputtering rate from 3:1 to 20:1. These process parameters can be modified to optimize the process for a given waveguide core geometry, selected materials and final device application The HDPCVD deposited cladding layer may be formed using a number of different possible source gases or combination of source gases such as: $SiH_4$, $SiD_4$, $Si_2H_6$, $Si_2D_6$, $SiHCl_3$, $SiDCl_3$, $SiCl_2D_2$, $SiCl_2H_2$, $GeH_4$, $GeD_4$, $PD_3$, $PH_3$, $BCl_3$, $BF_3$, $B_2H_6$, $B_2D_6$, $CD_4$, $CH_4$, $NH_3$, $ND_3$, NO, $N_2O$, $O_2$, CO, $CO_2$, $N_2$, $D_2O$, $H_2O$, $O_3$, $SiF_4$, and $SiCl_4$ where H denotes hydrogen and D deuterium respectively. In addition, a heavy, inert gas such as argon is often used to enhance material removal during HDPCVD. Other possible sources include vapors derived from liquid sources such as tetraethoxysilane (SOS), tetraethylorthosilicate, hexamethyldisiloxane, hexamethyldisilazene, tetramethoxysilane, and/or tetramethyldisiloxane, but this is less common as the molecules tend to dissociate in the high density plasma Typical optical cladding materials formed include: silica ($SiO_2$); silicon nitride ($Si_3N_4$); silica combined with germanium ($Si_xGe_yO$) wherein x and y are typically selected such that the atomic concentration of germanium is less than 12%; silica combined with nitrogen also known as silicon oxynitride ($SiO_xN_y$) where x ranges between 0 and 2 and y ranges between 0 and 1.3; silica combined with carbon ($SiO_xC_y$) where x and y are typically selected such that the atomic concentration of carbon is less than 25%; silica combined with fluorine ($SiO_xF_y$) in which x and y are selected such that the fluorine atomic concentration is less than approximately 12%; silica doped with boron (borosilicate glass, BSG) or phosphorus (phosphosilicate glass, PSG), preferably in amounts where the boron or the phosphorus form an atomic concentration of less than 12%, and silica combined with a combination of two or more of the following (germanium, nitrogen, carbon, fluorine, boron, and phosphorus) such that the cladding refractive index is lower than the optical core refractive index. The ability to control the cladding refractive index and the production of void-free, planar claddings permits greater flexibility in the choice of substrate and core materials. Further, the ability to create a desired core/cladding refractive index contrast ratio allows greater choice in device design since the larger the contrast, the smaller the permissible bend radius for a given device, creating more compact devices.

In an exemplary embodiment, the value of the upper cladding refractive index is selected to be approximately 1.4 to approximately 2.0.

Although the HDPCVD cladding deposition process itself is self-planarizing, optional additional planarization may be performed depending upon the device application. Particularly for thin cladding layers formed over high aspect ratio waveguide core elements some residual topography may remain. Different optical applications have different requirements for the amount of non-planar topography that can be tolerated. Undesired residual topography can be minimized and/or eliminated with planarization techniques such as: HDPCVD deposition of a silica-containing film over cladding 130; chemical-mechanical polishing (CMP); reflow by annealing a supplemental film deposited over the cladding layer such as borophosphosilicate glass (BPSG); etchback of a sacrificial planarizing layer such as photoresist, spin-on glasses (SOG), or inorganic and/or organic polymer based spin on dielectrics (SOD). CMP is the most commonly-employed prior art planarization method and creates highly planar surfaces.

Figure 3A:
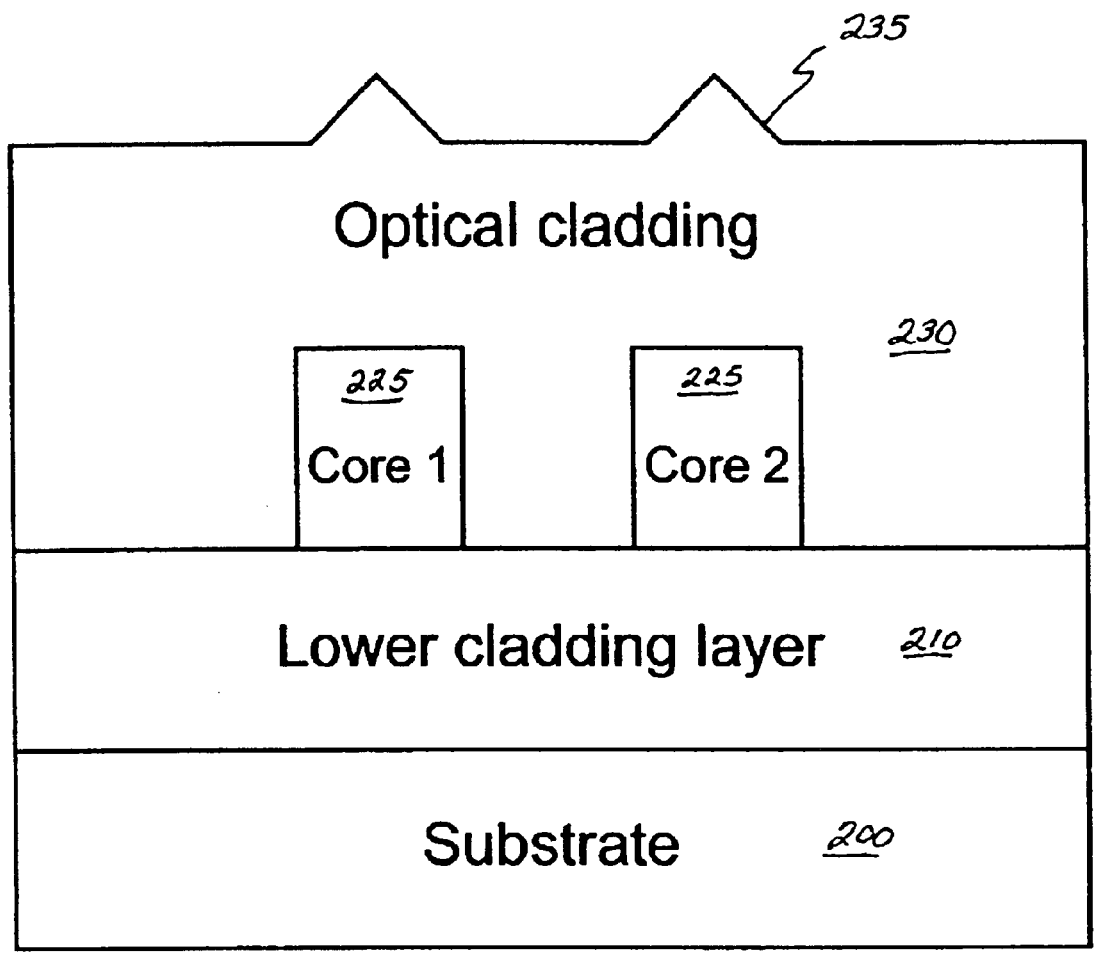
FIGS. 3A, 3B, and 3C depict multiple waveguide core layer optical integrated circuits formed according to a further embodiment of the present invention.
Figure 3B:
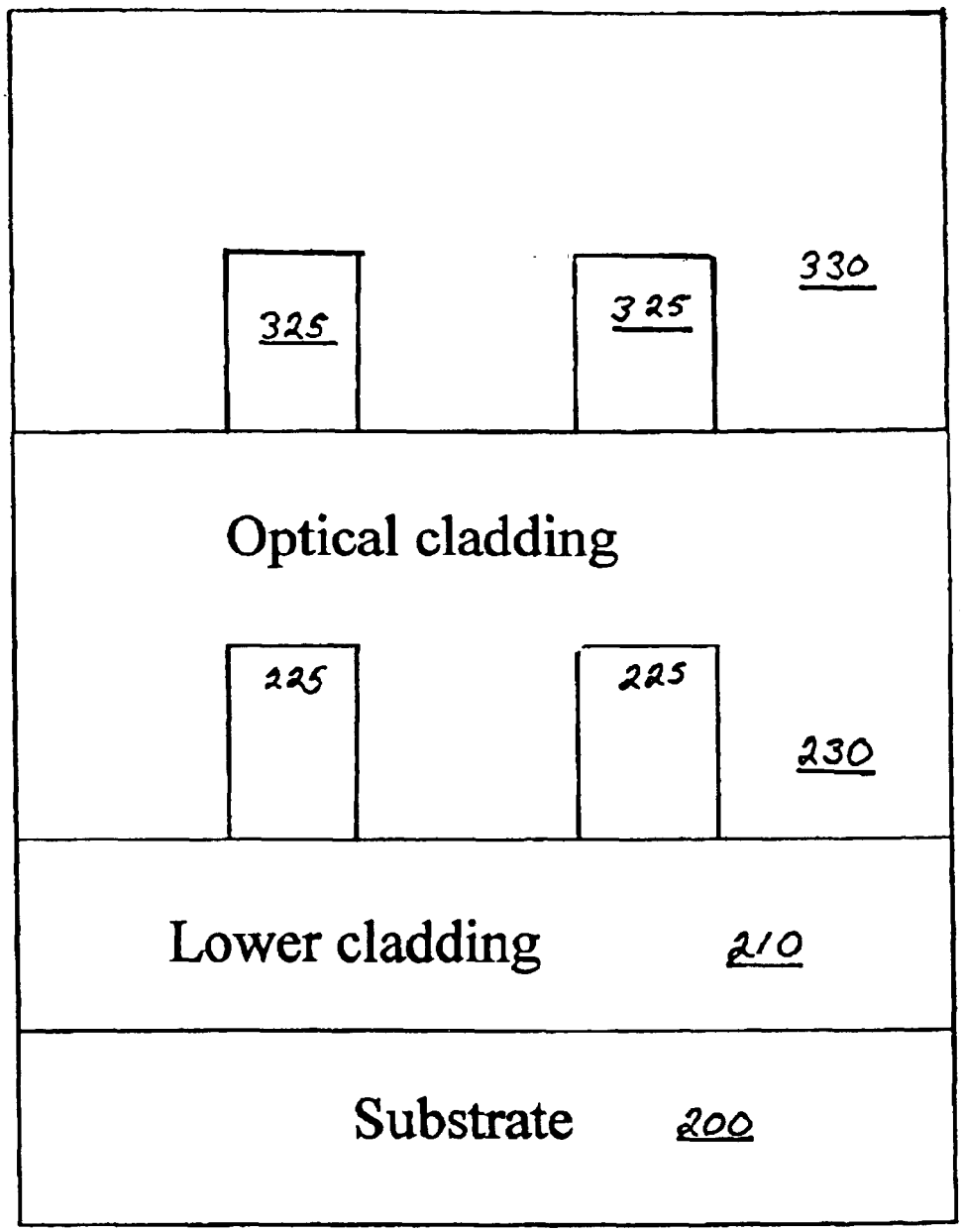

For square or rectangular waveguide core cross-sections, pyramidal topographic features may remain at the completion of the HDPCVD cladding formation depending on the material and thickness of the cladding layer and the deposition conditions. Such residual features are shown in FIGS. 3A and 3B. The waveguide structures of FIGS. 3A, 3B, and 3C include substrate 200, lower cladding 210, optical core waveguiding elements 225, and cladding layer 230. Here, due to material selection, process conditions, cladding thickness, and/or core geometry, pyramidal topographic features 235 (shown in their typically triangular cross-sectional formation) remain on cladding 230. A second layer of core waveguiding elements 325 is formed on cladding 230; elements 325 are then encased in an upper cladding layer 330, optionally produced using the simultaneous material deposition and material removal techniques of the present invention.

For some applications, the small variation in surface topography 235 will not affect the device function and waveguide cores 325 can be formed over surface of cladding 230 (FIG. 3A). For very sensitive applications or very thin cladding layers, topographic features 235 are removed before depositing cores 325 (FIG. 3B). FIG. 3B also represents a multiple waveguide core layer device in which the cladding layer is substantially planar in the as-deposited state. Layer 330 is a cladding layer for cores 325.

Figure 3C:
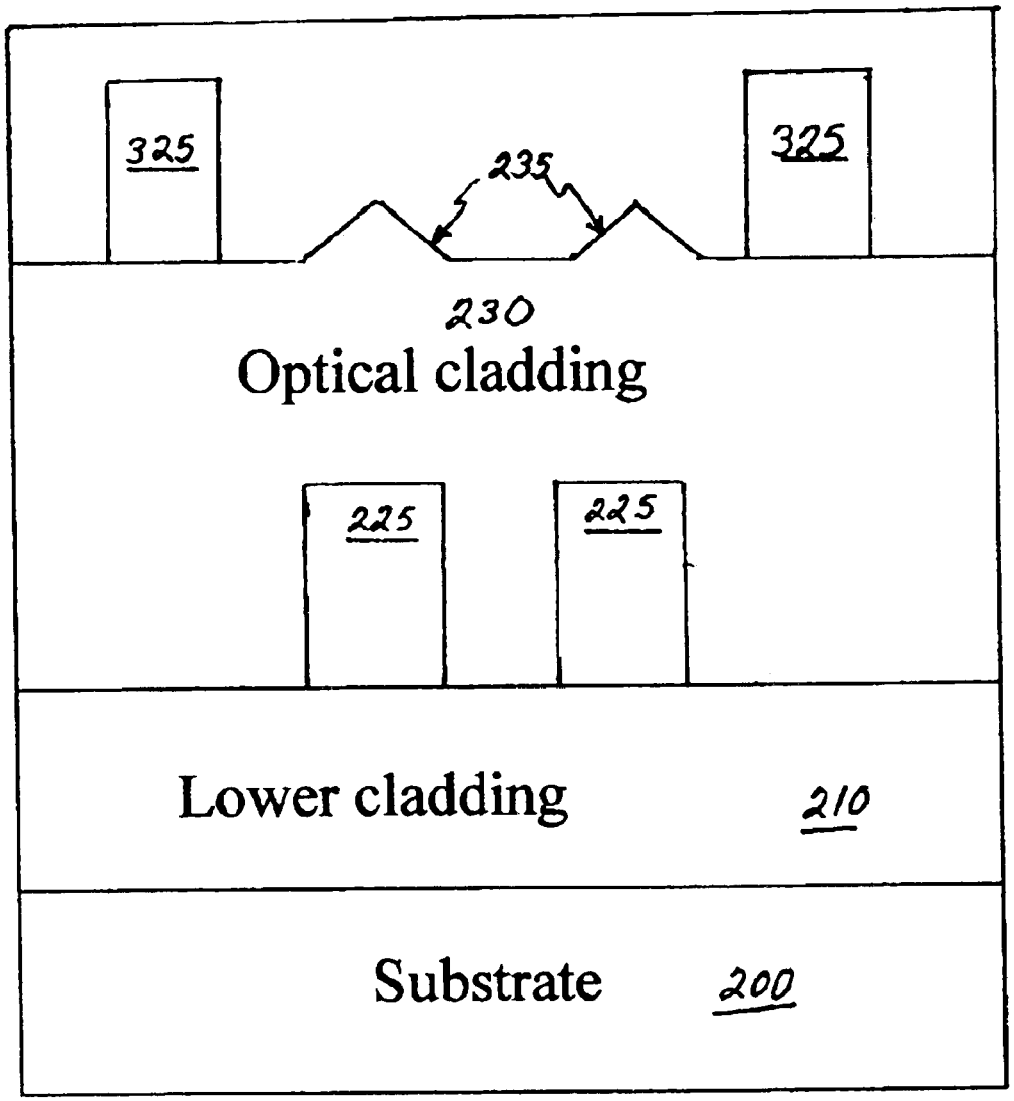

Finally, FIG. 3C represents a situation in which waveguide core elements 225 do not need to optically communicate with device elements 325 (which may be waveguides, heaters, electrical lines, etc.). In such an embodiment, subsequent cores are deposited on a portion of cladding layer 230 that does not include topography 235.

Advantageously, the present invention permits the formation of a dense, substantially defect-free and substantially planar cladding layer over an optical waveguiding core feature on a substrate without the requirement of high temperature annealing. This high quality cladding layer greatly expands the ability to form and integrate a number of optical devices and waveguides on a single chip. The combination of optical core and cladding layer creates an optical waveguide that may be combined with other optical waveguides and/or devices (such as ring resonators, arrayed waveguide grating multiplexers/demultiplexers, optical add/drop multiplexers, optical switches, variable attenuators, polarization splitters/combiners, multimode interference (MMI) couplers, Mach-Zehnder interferometer, tunable filters, and dispersion compensators) in lateral and/or vertical directions on a substrate to form an integrated optical device or planar lightwave circuit useful for optical communications in wavelength ranges from visible (0.4 to 0.7 $\mu$m) to the near infrared (0.7 to 2 $\mu$m) wavelength regions.

While the above invention has been described with reference to the particular exemplary embodiments, many modifications and functionally equivalent elements may be substituted without departing from the spirit and contributions of the present invention. Accordingly, modifications and functionally equivalent elements such as those suggested above, but not limited thereto, are considered to be within the scope of the following claims.

What is claimed is:

1. A method for forming an integrated optical circuit comprising:

providing a substrate;

forming a first cladding layer having a first cladding refractive index on the substrate;

forming a first core layer on the first cladding layer, the first core layer having a core refractive index;

defining waveguiding elements in the first core layer;

forming a second cladding layer having a second cladding refractive index on the waveguiding elements of the first core layer such that the first cladding layer and the second cladding layer encapsulate the waveguiding elements, the second cladding refractive index and the first cladding refractive index being less than the core refractive index, and wherein the second cladding layer is formed through simultaneous cladding material deposition and removal, the ratio of cladding material deposition to cladding material removal being approximately greater than 1 and less than 20 such that the second cladding layer is substantially void-free and substantially self-planarizing;

wherein the forming of the first core layer and any subsequent processing is performed at a temperature less than approximately 500° C.

2. A method for forming an integrated optical circuit as recited in claim 1 wherein forming the second cladding layer through simultaneous cladding material deposition and removal is performed using a high density plasma chemical vapor deposition process.

3. A method for forming an integrated optical circuit as recited in claim 2, wherein the high density plasma chemical vapor deposition is formed from a microwave source, an electron cyclotron resonance source or an inductively coupled plasma source with an independent RF bias applied to the substrate.

4. A method for forming an integrated optical circuit as recited in claim 1 wherein defining waveguiding elements in the first core layer is performed using photolithography, x-ray lithography, or electron-beam lithography.

5. A method for forming an integrated optical circuit as recited in claim 1 wherein waveguiding elements are defined in the first core layer through a direct write process.

6. A method for forming an integrated optical circuit as recited in claim 1 wherein the second cladding layer is formed by high density chemical vapor deposition using vapors from liquid sources selected from tetraethoxysilane, tetraethylorthosilicate, hexamethyldisiloxane, hexamethyldisilazene, tetramethoxysilane, or tetramethyldisiloxane.

7. A method for forming an integrated optical circuit as recited in claim 1 wherein the second cladding layer is formed by high density chemical vapor deposition using one or more gases selected from $SiH_4$, $SiD_4$, $Si_2H_6$, $Si_2D_6$, $SiHCl_3$, $SiDCl_3$, $SiCl_2D_2$, $SiCl_2H_2$, $GeH_4$, $GeD_4$, $PD_3$, $PH_3$, $BCl_3$, $BF_3$, $B_2H_6$, $B_2D_6$, $CD_4$, $CH_4$, $NH_3$, $ND_3$, $NO$, $N_2O$, $O_2$, $CO$, $CO_2$, $N_2$, $D_2O$, $H_2O$, $O_3$, $SiF_4$, and $SiCl_4$.

8. A method for forming an integrated optical circuit as recited in claim 1 wherein the substrate comprises silicon, silica, fused quartz, sapphire, glass, gallium arsenide, silicon carbide, or indium phosphide.

9. A method for forming an integrated optical ciifcuit as recited in claim 1 wherein the defined waveguiding elements in the first core layer have a height of 0.5 to 15 microns and a width of 0.5 to 15 microns.

10. A method for forming an integrated optical circuit as recited in claim 1 wherein further optical waveguiding and cladding layers are positioned on the second optical cladding layer.

* * * * *

UNITED STATES PATENT AND TRADEMARK OFFICE
CERTIFICATE OF CORRECTION

PATENT NO. : 6,949,392 B2
DATED : September 27, 2005
INVENTOR(S) : David M. Gill, Frederick G. Johnson and Oliver S. King It is certified that error appears in the above-identified patent and that said Letters Patent is hereby corrected as shown below:

Column 1,
Line 44, should read -- ...poor results for the optical cladding layer due to... --.

Column 2,
Line 3, should read -- ...of prior art CVD techniques. In general,... --.
Line 28, should read -- ...small localized variations in the cladding... --.
Line 38, should read -- ...(LPCVD) deposition of a thin borophosphosilicate glass... --.

Column 6,
Line 14, should read -- ...surface, helping to densify the film... --.
Line 17, should read -- ...with sloped surfaces on the growing film... --.
Line 39, should read -- ...D/R, deposition temperature, pressure, RF... --.
Line 49, should read -- ...with an optimized process... --.
Line 57, should read -- ...1 to 5 kW, chamber pressure between 1 to 25... --.

Column 7,
Line 7, should read -- ...ethoxysilane (TEOS), tetraethylorthosilicate --.

Column 10,
Line 18, should read -- ...forming an integrated optical circuit as --.

Signed and Sealed this

Twenty-first Day of February, 2006

JON W. DUDAS
*Director of the United States Patent and Trademark Office*